United States Patent
Jeong et al.

(10) Patent No.: US 7,203,512 B2
(45) Date of Patent: Apr. 10, 2007

(54) SOFT COMBINING APPARATUS AND METHOD IN A CDMA MOBILE COMMUNICATION SYSTEM PROVIDING MBMS SERVICE

(75) Inventors: Kwang-Yung Jeong, Yongin-si (KR); Sung-Ho Choi, Suwon-si (KR); Young-Bum Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 240 days.

(21) Appl. No.: 10/900,762

(22) Filed: Jul. 28, 2004

(65) Prior Publication Data

US 2005/0063339 A1   Mar. 24, 2005

(30) Foreign Application Priority Data

Jul. 28, 2003   (KR) ............................... 2003-52108

(51) Int. Cl.
*H04Q 7/20* (2006.01)
(52) U.S. Cl. .................. 455/522; 455/436; 455/69; 455/67.11
(58) Field of Classification Search ............. 455/67.13, 455/69, 3.02, 3.01, 436, 437, 439, 442, 557, 455/452.1, 432.3; 370/235, 278, 312, 318, 370/328, 392, 331, 335, 342, 395.4, 412
See application file for complete search history.

(56) References Cited

U.S. PATENT DOCUMENTS

| | | | | |
|---|---|---|---|---|
| 6,963,745 | B2* | 11/2005 | Singh et al. ................. | 455/437 |
| 6,987,985 | B2* | 1/2006 | Purkayastha et al. .... | 455/552.1 |
| 6,996,410 | B2* | 2/2006 | Bos et al. .................... | 455/466 |
| 7,010,317 | B2* | 3/2006 | Hwang et al. .............. | 455/522 |
| 2003/0207696 | A1* | 11/2003 | Willenegger et al. ........ | 455/522 |
| 2005/0085182 | A1* | 4/2005 | Chuberre et al. .......... | 455/3.01 |

\* cited by examiner

*Primary Examiner*—Jean Gelin
(74) *Attorney, Agent, or Firm*—The Farrell Law Firm

(57) ABSTRACT

A method and apparatus for determining soft handover in a CDMA mobile communication system supporting Multimedia Broadcast/Multicast Service (MBMS) is provided. In the asynchronous CDMA mobile communication system supporting MBMS, when a UE moves to a region where it can receive data from a plurality of Node Bs, the UE determines whether to perform soft combining using a measurement value of a dedicated pilot channel signal, in performing soft handover. In this way, the UE can determine whether to perform soft combining on MBMS data received from a plurality of Node Bs by itself. Therefore, even though an MBMS user moves from a current or existing cell to a new cell, a stable MBMS service is provided to the user, thereby contributing to the user's convenience.

10 Claims, 6 Drawing Sheets

SOFT COMBINING APPARATUS AND METHOD IN A CDMA MOBILE COMMUNICATION SYSTEM PROVIDING MBMS SERVICE

PRIORITY

This application claims priority under 35 U.S.C. § 119 to an application entitled "Soft Combining Apparatus and Method in a CDMA Mobile Communication System Providing MBMS Service" filed in the Korean Intellectual Property Office on Jul. 28, 2003 and assigned Serial No. 2003-52108, the contents of which are incorporated herein by reference.

BACKGROUND OF THE INVENTION

1. Field of the Invention

The present invention relates generally to a soft handover method in an asynchronous Code Division Multiple Access (CDMA) mobile communication system, and in particular, to a soft combining apparatus and method for soft handover in Multimedia Broadcast/Multicast Service (MBMS).

2. Description of the Related Art

Due to recent developments occurring in the tele-communication industry, CDMA mobile communication systems are required to provide a multicasting multimedia communication service for transmitting large volumes of data, such as packet data and circuit data, as well as providing voice service.

In order to support multicasting multimedia communication, a service known as Broadcast/Multicast Service is available for providing a service from one data source to a plurality of user equipments (UEs). Broadcast/Multicast Service can be classified into Cell Broadcast Service (CBS), supporting a message-based service, and Multimedia Broadcast/Multicast Service (MBMS), supporting a multimedia service for transmission of real-time image and voice data, still images, and text data.

The CBS service provides a plurality of messages to all UEs located in a particular service area. The specific service area where the CBS service is provided can become an area providing CBS service when the CBS service is provided within one cell.

The MBMS service, which simultaneously provides voice data and image data, requires a large amount of transmission resources. The MBMS service is provided through a broadcasting channel with a view towards the possibility that a plurality of services can be simultaneously performed within one cell. In particular, the MBMS service requires more radio resources when compared to the CBS service. Therefore, messages in an MBMS service are actually broadcasted only in a service area where a UE can receive the MBMS service.

Since a UE typically does not stay in one cell area, but moves from one cell area to another cell area, an the existing voice service and data service of that UE can be continued through soft handover. During data transmission/reception, handover of service can be roughly classified into handover in a CELL_DCH state and handover in a CELL_FACH state.

Handover in a CELL_DCH state refers to handover performed in a state where a dedicated channel (DCH) is set up. In the handover procedure in a CELL_DCH state, a UE measures a common pilot channel signal (CPICH) and reports the measurement result to a serving radio network controller (SRNC). The SRNC determines whether to perform handover based on the report from the UE, and sends a handover command to the UE according to the determination result. Therefore, it is possible to soft-combine the report from the UE with the handover command from the SRNC.

Handover in a CELL_FACH state refers to handover performed in a state where a forward access channel (FACH) is set up. In the handover procedure in a CELL_FACH state, a UE determines a best cell by itself by measuring CPICH thereby to perform cell update. In this case, it is not possible to perform the soft-combining, because the UE makes no report to the SRNC. Therefore, the MBMS service, which should consider the handover in a CELL_FACH state as it is provided through a broadcasting channel, faces a soft combining problem.

SUMMARY OF THE INVENTION

It is, therefore, an object of the present invention to provide a soft handover apparatus and method for a UE receiving an MBMS service in an asynchronous CDMA mobile communication system.

It is another object of the present invention to provide an apparatus and method for enabling a UE to determine whether to perform soft combining by itself through measurement of a common pilot channel or a dedicated pilot channel.

It is further object of the present invention to provide an apparatus and method for controlling reception of MBMS data by comparing a measurement value of a sub-pilot channel signal with a measurement value of a dedicated pilot channel signal currently in reception, instead of comparing a measurement value of a dedicated pilot channel signal with an absolute value having a hysteresis characteristic.

It is yet another object of the present invention to provide an apparatus and method for performing extraction of MBMS data regardless of a comparison value between a measurement value of a dedicated pilot channel signal and an absolute value having a hysteresis characteristic, stored in a finger, and enabling a combiner to determine whether to combine MBMS data.

In accordance with a first aspect of the present invention, there is provided a method for soft-combining Multimedia Broadcast/Multicast Service (MBMS) data from a source Node B and neighbor Node Bs by a user equipment (UE) in a Code Division Multiple Access (CDMA) mobile communication system including the source Node B for providing MBMS data for an MBMS service, the UE for receiving the MBMS data from the source Node B, and the neighbor Node Bs to which handover from the source Node B can be properly performed. The method includes the steps of measuring reception power of a dedicated pilot channel signal from at least one neighbor Node B that provides the same MBMS service as the MBMS service from the source Node B among the neighbor Node Bs; and comparing the measured reception power with a predetermined threshold, and soft-combining MBMS data from the at least one neighbor Node B with MBMS data form the source Node B according to the comparison result.

In accordance with a second aspect of the present invention, there is provided an apparatus for soft-combining Multimedia Broadcast/Multicast Service (MBMS) data from a source Node B with MBMS data from a neighbor Node B by a user equipment (UE) in an asynchronous Code Division Multiple Access (CDMA) mobile communication system including the source Node B for providing MBMS data for an MBMS service, the UE for receiving the MBMS data from the source Node B, and at least one neighbor Node B to which handover from the source Node B can be properly performed, the neighbor Node B providing the MBMS service provided by the source Node B. In the apparatus, a dedicated pilot channel estimator measures reception power of a dedicated pilot channel signal assigned thereto among dedicated pilot channel signals from neighbor Node Bs, and determines whether to perform soft combining on MBMS data from a corresponding neighbor Node B according to whether the measurement value satisfies a predetermined condition. Demodulators receive MBMS data from the corresponding neighbor Node B and demodulate the MBMS data according to the determination result of the dedicated pilot channel estimator. A combiner performs soft combining on the MBMS data, if the MBMS data is received from at least two of the demodulators.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
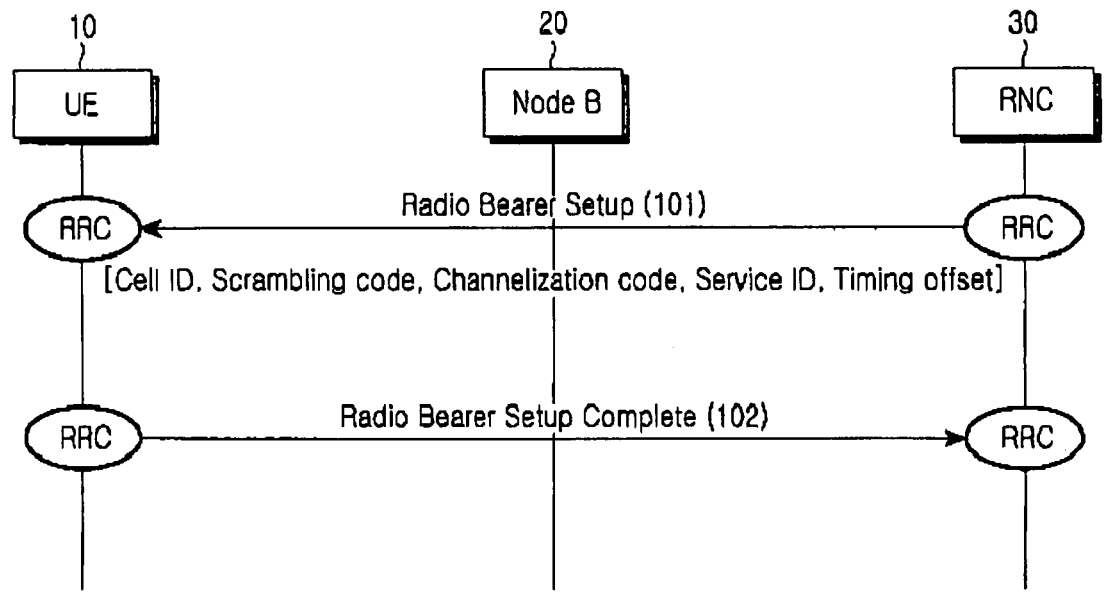
FIG. 1 is a diagram illustrating a Radio Bearer Setup procedure in an asynchronous CDMA mobile communication system according to an embodiment of the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

In order to stably transfer data to a UE located in a soft handover region, soft combining should be provided, even for an MBMS service. Therefore, the present invention provides a scheme for enabling a UE to perform soft combining by itself as necessary, for efficient MBMS service.

However, it is not easy for a UE to soft-combine MBMS data received over a common channel from different Node Bs. This is because an asynchronous mobile communication system supporting an MBMS service does not support time synchronization between Node Bs. Therefore, in order to soft-combine MBMS data, it is necessary to maintain a minimum transmission time difference between MBMS data. There have been proposed various schemes for maintaining the minimum transmission time difference between MBMS data. In an embodiment of the present invention, it is assumed that the minimum transmission time difference between MBMS data is maintained.

In the following description, the present invention defines information necessary for performing soft combining by a UE and presents a signaling procedure for providing the defined information to the UE. Further, the present invention provides a detailed description of a UE structure for performing soft combining and a soft combining procedure performed by the UE.

A. Information on Neighbor Cells

Information on neighbor cells necessary for an embodiment of the present invention will be defined herein below.

In order for a UE to perform soft combining by itself on MBMS data according to an embodiment of the present invention, the UE must have information on at least one appropriate neighbor cell to which it will be soft-handed over from the cell where it is currently located. To this end, the UE receives the information on at least one neighbor cell from a radio network controller (RNC) via the cell where it is currently located. It is assumed herein that the current cell and the neighbor cells are managed by the same RNC.

Table 1 defines the information on at least one neighbor cell.

TABLE 1

| Info #1 | ID information on neighbor cells |
| Info #2 | Code information used for MBMS service in neighbor cells (Scrambling code, Channelization code) |
| Info #3 | Information on MBMS services provided from neighbor cells |
| Info #4 | Time offset information in neighbor cells (Frame offset, Chip offset) |

In Table 1, 'Info #1' represents identification (ID) information for identifying at least one appropriate neighbor cell to which a UE will be soft-handed over from its current cell. The UE recognizes neighbor cells to which it can be soft-handed over, based on the Info #1.

'Info #2' represents code information used for MBMS service in each of the neighbor cells. The code information includes scrambling code and channelization code. The UE can receive MBMS data provided from the neighbor cells, using the code information.

'Info #3' represents information on a type of MBMS service provided from each of the neighbor cells. The MBMS service type information refers to an MBMS ID for identifying the MBMS service. The UE can determine a neighbor cell providing a desired MBMS service among the neighbor cells based on the Info #3.

'Info #4' represents time offset information for each of neighbor cells. The time offset information includes information representative of a time difference between a frame start point of MBMS data and a frame start point of CPICH in each of the neighbor cells. The UE soft-combines MBMS data received at different points from the neighbor cells based on the Info #4.

The UE receiving the neighbor cell information, if a target cell to which it desires to move is determined, determines whether a desired MBMS service is available in the target cell based on the Info #3. If the desired MBMS service is available in the target cell, the UE can receive MBMS data from the target cell based on the Info #2 constituting the neighbor cell code information. The UE can soft-combine MBMS data from the current cell with the MBMS data from the target cell based on the Info #4 constituting the neighbor cell time offset information.

However, if the desired MBMS service is not available in the target cell, the UE may not perform soft combining or send a request for the desired MBMS service to the target cell. When a particular neighbor cell has previously provided a specific MBMS service but does not currently provide the specific MBMS service, the particular neighbor cell is excluded from an MBMS service neighbor cell list.

B. Signaling Procedure

With reference to the accompanying drawings, a detailed description will now be made of a signaling procedure for transferring neighbor cell information to a UE according to an embodiment of the present invention.

A typical signaling procedure performed in an asynchronous mobile communication system supporting MBMS service can be divided into the following three procedures.

A first signaling procedure refers to a Radio Bearer Setup procedure that a UE currently not receiving an MBMS service performs in order to receive an MBMS service.

A second signaling procedure refers to a Radio Bearer Reconfiguration procedure. This signaling procedure is performed when a UE, though it has not moved to a new cell, experiences a change in its surrounding environment. That is, this signaling procedure is performed when information on neighbor cells providing the MBMS service, including the current cell, is changed so it is necessary to set up a new radio bearer.

A third signaling procedure refers to a Cell Update procedure. This signaling procedure is performed when a UE moves to a new cell, thus changing its surrounding environment. That is, this signaling procedure is performed when it is necessary to perform cell update because neighbor cell information changes due to movement of the UE.

The present invention proposes a method for transferring the neighbor cell information to the UE through the above three signaling procedures.

B.1 Signaling Procedure for Radio Bearer Setup

FIG. 1 is a diagram illustrating a signaling procedure for Radio Bearer Setup. The Radio Bearer Setup procedure corresponds to an initial procedure for an MBMS service.

Referring to FIG. 1, in step 101, an RNC 30 transmits a Radio Bearer Setup message to a UE 10. Transmission of the Radio Bearer Setup message is equivalent to requesting setup of a radio bearer. The Radio Bearer Setup message includes MBMS code information for a current cell providing an MBMS service, service information, and MBMS time offset information. The MBMS code information is used for transmitting MBMS data, and includes scrambling code information and channelization code information. The UE 10 can despread MBMS data from the current cell using the MBMS code information. The service information is information on an MBMS service provided from the current cell, and can be provided in the form of a service ID. The UE 10 can identify an MBMS service using the service ID. The MBMS time offset information refers to time information of a channel for transmitting MBMS data, and is information indicative of a difference between a start point of a frame transmitting the MBMS data and a start point of a CPICH frame. The MBMS time offset information is used for supporting soft combining in a UE for the MBMS service.

The RNC 30 transmits neighbor cell information to the UE 10 through the Radio Bearer Setup RRC (radio resource control) message. The neighbor cell information has been defined in Table 1. As a result, the UE 10 can perform soft handover on the MBMS service by itself. The possibility of performing soft handover means the possibility of soft-combining MBMS data from a plurality of possible target cells.

The UE 10 sets up a radio bearer based on the information provided from the RNC 30. Thereafter, in step 102, the UE 10 transmits a Radio Bearer Setup Complete message to the RNC 30, completing the Radio Bearer Setup procedure. The Radio Bearer Setup message and the Radio Bearer Setup Complete message are radio resource control (RRC) messages exchanged between an RRC layer of the RNC 30 and an RRC layer of the UE 10.

When the setup of a radio bearer is completed, the UE 10 can receive desired MBMS data from a Node B 20. The UE 10, when it moves to a handover region, performs soft combining on MBMS data from the current cell and the neighbor cells, using the neighbor cell information.

B.2 Signaling Procedure for Radio Bearer Reconfiguration

Figure 2:
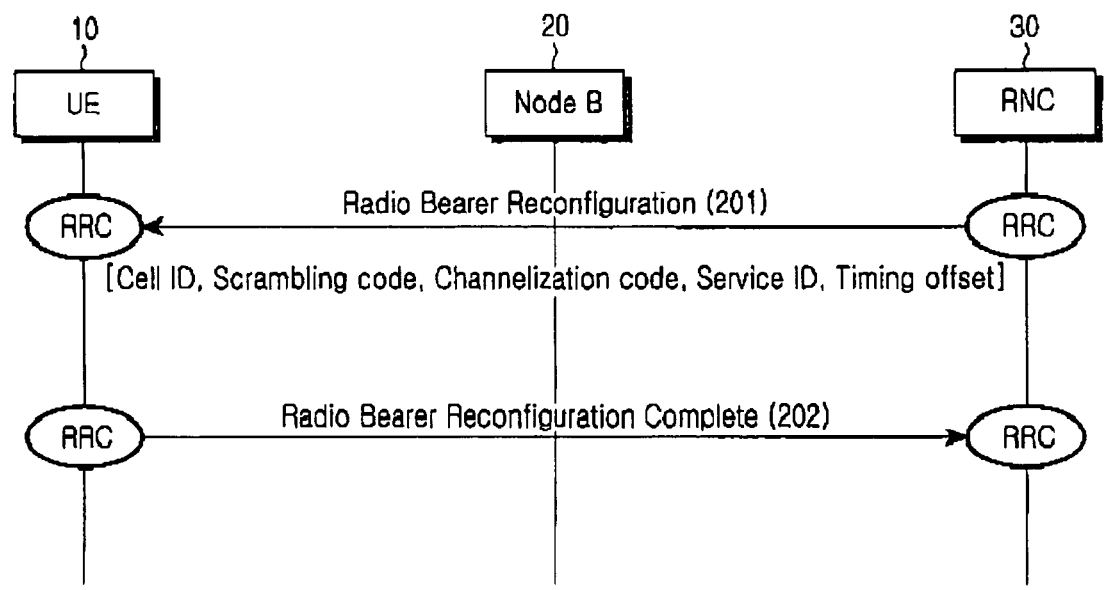
FIG. 2 is a diagram illustrating a Radio Bearer Reconfiguration procedure in an asynchronous CDMA mobile communication system according to an embodiment of the present invention.

FIG. 2 is a diagram illustrating a signaling procedure for Radio Bearer Reconfiguration. The signaling procedure between a UE and an RNC for Radio Bearer Reconfiguration is similar to the above-stated signaling procedure for Radio Bearer Setup. However, while the Radio Bearer Setup procedure is an initial signaling procedure for receiving MBMS data, the Radio Bearer Reconfiguration procedure is a signaling procedure in a situation where MBMS data is already being received. That is, the Radio Bearer Reconfiguration procedure is performed when it is necessary to change a previously set-up radio bearer due to a change in the surrounding environment of a UE. The Radio Bearer Reconfiguration procedure includes an update procedure for changing previously set information, adding a new cell to an active set, or deleting an old cell from the active set.

The Radio Bearer Reconfiguration procedure is performed when information on the current cell or the neighbor cells changes while the UE does not move out of its present cell. A change in information on the current cell (or corresponding cell) corresponds to a change in MBMS code information, service information, and MBMS time offset information for the current cell. A change in information on the neighbor cell can correspond to a change in information on an added neighbor cell or an existing neighbor cell. The addition of a neighbor cell is a cell providing the same MBMS service, and for the addition, cell ID information for the corresponding cell can be provided. In particular, even though a channel currently providing an MBMS service may interrupt data transmission for some reason, the Radio Bearer Reconfiguration procedure is not needed. Meanwhile, the change in information on the existing neighbor cell corresponds to a change in information on a neighbor cell that is transmitting the same MBMS data as that of the current cell. That is, the change in information on the existing neighbor cell corresponds to a case where MBMS code information in a neighbor cell, service information, and MBMS time offset information are changed or a channel over which MBMS data was transmitted is changed for another use.

The Radio Bearer Reconfiguration procedure is also performed each time a neighbor cell providing an MBMS service is deleted. Accordingly, the signaling procedure is performed frequently. In order to solve this problem, the present invention performs the Radio Bearer Reconfiguration procedure not when a neighbor cell is deleted, but when a channel previously providing an MBMS service is assigned for another service. Aditionally, it is not possible to perform efficient communication through the existing soft combining method. In order to solve this problem, the present invention determines whether to receive an MBMS service according to whether the MBMS service is available or if there is a free dedicated pilot channel, and performs soft combining according to the determination result. This is possible by using a device for analyzing a measurement value of a dedicated pilot channel in a finger.

Referring to FIG. 2, in step 201, an RNC 30 transmits a Radio Bearer Reconfiguration message to a UE 10. The Radio Bearer Reconfiguration message is transmitted to request reconfiguration of a radio bearer. The Radio Bearer Reconfiguration message provides MBMS code information that has changed in a cell currently providing the MBMS service, service information, and MBMS time offset information. In addition thereto, the Radio Bearer Reconfiguration message also provides neighbor cell information so that the UE 10 can perform soft combining by itself. The UE 10 performs a Radio Bearer Reconfiguration operation based on information received through the Radio Bearer Reconfiguration message. Thereafter, in step 202, the UE 10 transmits a Radio Bearer Reconfiguration Complete message to the RNC 30, completing the Radio Bearer Reconfiguration procedure. The Radio Bearer Reconfiguration message and the Radio Bearer Reconfiguration Complete message are RRC messages exchanged between an RRC layer of the RNC 30 and an RRC layer of the UE 10.

When the reconfiguration of a radio bearer is completed, the UE 10 can receive desired MBMS data from a Node B 20. The UE 10, when it moves to a handover region, performs soft combining on MBMS data from the current cell and the neighbor cells, using the neighbor cell information.

B.3 Signaling Procedure for Cell Update

Figure 3:
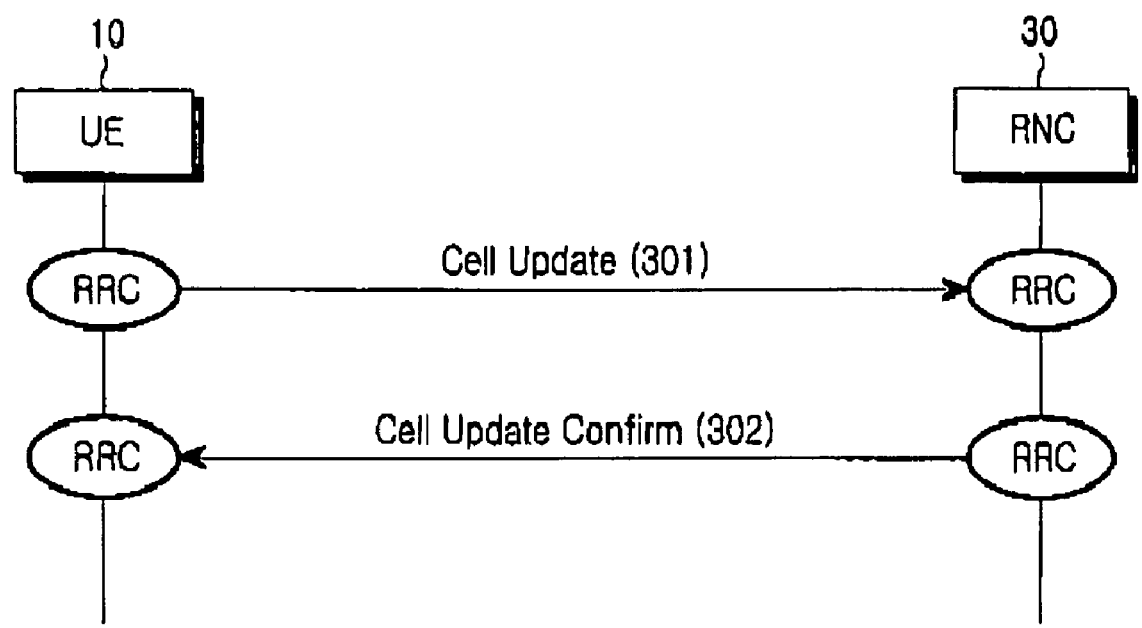
FIG. 3 is a diagram illustrating a Cell Update procedure in an asynchronous CDMA mobile communication system according to an embodiment of the present invention.

FIG. 3 is a diagram illustrating a signaling procedure for Cell Update. The Cell Update procedure is a signaling procedure between an RNC 30 and a UE 10 performed when a surrounding environment has changed due to movement of the UE 10.

Referring to FIG. 3, if the UE 10 enters a cell update region by moving from an existing or current cell to a neighbor cell, a Cell Update process is performed by the UE 10. The cell update region, like the handover region, exists around a cell boundary. However, the cell update region is smaller in scale than the handover region and is included in the handover region. As described above, the UE 10 can perform soft combining in the handover region through the Radio Bearer Setup/Reconfiguration procedures.

The UE 10 entering the cell update region performs cell update. In this case, in step 301, the UE 10 transmits a Cell Update message to an RNC 30. The transmission of the Cell Update message starts the Cell Update procedure.

In the Cell Update procedure, a target cell, or a cell to which the UE 10 transmits a Cell Update message, corresponds to one of the following two cases.

In a first case, as the UE 10 enters the handover region, it can receive desired MBMS data from the target cell. That is, the target cell provides an MBMS service available in an existing or current cell. In this case, upon receiving the Cell Update message, the RNC 30 updates the target cell as a cell that currently provides the MBMS service. Further, the RNC 30 updates a cell that was previously providing the MBMS service as a neighbor cell. In addition, the RNC 30 updates information on a neighbor cell providing the MBMS service among neighbor cells of the target cell.

Thereafter, in step 302, the RNC 30 transmits a Cell Update Confirm RRC message to the UE 10. The Cell Update Confirm RRC message is used to transmit information on the current cell and neighbor cells. The information on the current cell and neighbor cells has been described above. Because the UE 10 performing the Cell Update process is still located in the handover region, it continues to perform soft combining.

In a second case, even though the UE 10 has entered the handover region, it cannot receive desired MBMS data from the target cell. That is, the target cell does not provide the MBMS service available in the existing or current cell. In this case, the UE 10 performs the Cell Update process when it enters the cell update region in the handover region.

Upon receiving the Cell Update message from the UE 10, the RNC 30 allows the target cell to transmit MBMS data desired by the UE 10. That is, the RNC 30 allows the target cell to perform the signaling procedure such as the Radio Bearer Setup procedure. Thereafter, the RNC 30 updates the cell that was previously providing the MBMS service to the UE 10 as a neighbor cell, and updates information on a neighbor cell providing the MBMS service among neighbor cells of the target cell. When the cell update is completed, the RNC 30 transmits a Cell Update Confirm RRC message to the UE 10 in step 302.

Even in the Cell Update process, the UE 10 continues to receive MBMS data from the previous cell. After the cell update, the UE 10 receives the MBMS data even from the target cell, and thus performs soft combining.

C. Structure and Operation of UE

C.1 Structure of UE

A description will now be made of a structure of a UE for performing soft combing according to an embodiment of the present invention.

Figure 4:
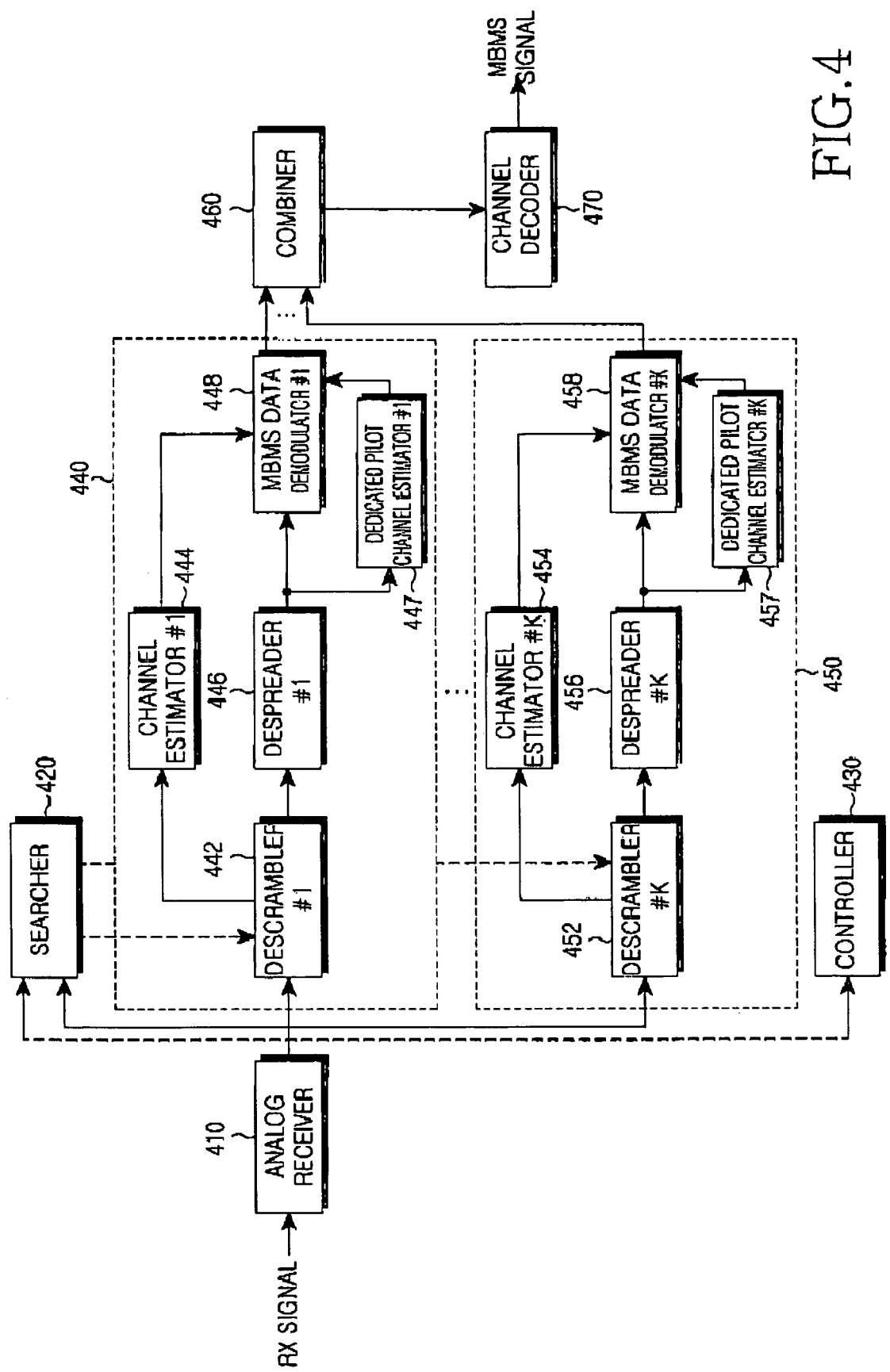
FIG. 4 is a block diagram illustrating a receiver structure of a UE in an asynchronous CDMA mobile communication system according to an embodiment of the present invention.

FIG. 4 is a block diagram illustrating a receiver structure of a UE according to an embodiment of the present invention. Referring to FIG. 4, a reception signal from a Node B is provided to an analog receiver 410. The analog receiver 410 converts the reception signal a digital signal. The digital signal is input to a searcher 420 and k fingers 440 to 450.

A controller 430 receives information on neighbor cells from an RNC, so that it knows neighbor cells where the current MBMS service is available. For soft combining MBMS data, the controller 430 controls the searcher 420 such that the searcher 420 searches cells providing the same MBMS service among the neighbor cells.

The searcher 420 measures a CPICH value for each of multipath signals received via the analog receiver 410. The measured value is a received signal code power (RSCP) or Ec/No value, and monitors reception power of a corresponding signal. The searcher 420 provides the measured value to the controller 430.

The controller 430 allows the searcher 420 to perform proper finger assignment based on the measured value for each multipath signal. That is, the controller 430 arranges the measured values in power order, and commands the searcher 420 to assign fingers in order of the arranged measured values.

The searcher 420 receives a finger assignment command from the controller 430. The searcher 420 assigns signals to the fingers according to the finger assignment command. The searcher 420 can control descramblers 442 to 452 of the fingers 440 to 450 to assign the signals. The searcher 420 provides the fingers with timing information and cell information (i.e. scrambling code and channelization code).

For example, in some cases, a UE currently receiving particular MBMS data may move to a possible soft handover region. That is, assuming that the UE moves from a particular cell A to a neighbor cell B, and cell B is a Node B providing the particular MBMS service, the signal that the searcher 420 receives includes both a multipath signal from cell A and a multipath signal from the cell B. Therefore, the searcher 420 measures CPICH values for the multipath signals received from cell A and cell B, and provides the measured values to the controller 430.

The controller 430 sums up the measured values for the multipath signal received from cell B, and sums up the measured values for the multipath signal received from cell A. Thereafter, the controller 430 compares the two summed values, and determines whether any one of the following two conditions is satisfied. In case of a first condition, the summed value of the measured values for the multipath signal from cell B is larger than the summed value of the measured values for the multipath signal from cell A by a predetermined threshold or higher. In case of a second condition, a difference between signal levels of cell A and cell B falls within a predetermined hysteresis value.

If any one of the two conditions is satisfied, the controller 430 analyzes neighbor cell information to determine whether the desired MBMS service is available in cell B. The desired MBMS service refers to the MBMS service already available in cell A.

Asides from the two conditions, if the summed value of the measured values for the multipath signal from cell B is larger than a predetermined threshold, the controller 430 determines whether the MBMS service which was available in cell A is available in cell B. The threshold stated above is different in its meaning from the threshold used in the first condition. That is, the threshold in the first condition corresponds to an error value between the measured value for cell B and the measured value for cell A. However, the threshold in the added example corresponds to the measured value for cell B. Therefore, it is preferable that the threshold in the added example should be set a value higher than the threshold in the first condition.

If the MBMS service available in cell A is also available in cell B, the controller 430 allows the searcher 420 to assign corresponding fingers to cell A and cell B. This is to enable the UE to determine whether to perform soft combining on MBMS data from cell B. Generally, the finger assignment is performed in order of higher power of reception signals.

The searcher 420 provides timing information (i.e. frame offset) between signal components and cell information (i.e. scrambling code and channelization code) so that the signal components assigned to the fingers can be ultimately combined. The frame offset may be different from an offset of a CPICH signal for a path to each cell. Therefore, during cell assignment by the searcher 420, the controller 430 informs a corresponding finger of a frame offset of each MBMS signal.

However, if the MBMS service available in cell A is not available in cell B, even though the above conditions are satisfied, soft combining cannot be achieved. In this case, finger assignment is performed on only a multipath signal from cell A. However, if MBMS data transmitted by cell B is different MBMS data transmitted by cell A, the UE can request the RNC to transmit the same MBMS data as that transmitted by cell A. As a result, soft combining on the desired MBMS data is possible.

If soft combining is not currently performed because the UE is located only in a region of cell A, or if the soft combining conditions are not satisfied, each finger is assigned only a multipath signal from cell A.

In the above two conditions, it is assumed that RSCP or Ec/No of a received CPICH signal is excellent. However, even if RSCP or Ec/No of a received CPICH signal is not excellent, an actual MBMS data signal may be occasionally excellent. In this case, if the decision to perform soft combining is based only on the CPICH signal, an opportunity of soft handover is lost. Therefore, in order to prevent such a situation, the controller 430 can use the MBMS data signal as well as the CPICH signal as a criterion for soft combining. For example, there is a possible method for using a common pilot channel signal. Even though cell B exists in a list of neighbor cells providing the MBMS service, it is determined whether values provided by dedicated pilot channel estimators 447 and 457 are smaller than an absolutely determined value or a measured value for a cell currently in soft combining and a relatively determined hysteresis value or an absolute value. A method for determining whether to perform soft combining based on the determination result can be divided into a method performed by fingers 440 and 450 and a method performed by a combiner 460. That is, it is determined whether MBMS service is performed in a channel actually determined as an MBMS channel, and the fingers 440 and 450 inform the combiner 460 whether to perform combining. Alternatively, the combiner 460 determines whether to perform combining through the measured value and the criterion provided by the controller 430. Herein, the present invention will be described with reference to an example where whether to perform combining is determined by the fingers 440 and 450. The combiner 460 can determine whether to combine MBMS data provided from the fingers 440 and 450.

If the controller 430 determines to assign MBMS data to a finger in the above procedure, it can allow the combiner 460 to combine respective signal components by sending an MBMS offset value provided from the RNC to the corresponding finger.

Here, a block for demodulating multipath components of an MBMS data signal will be called a "finger," and the finger is comprised of a descrambler, a despreader, an MBMS data demodulator, a dedicated pilot channel estimator, and a channel estimator. FIG. 4 shows k fingers 440 to 450, by way of example. In the following description, it will be assumed that all of the k fingers have been assigned.

A digital signal from the analog receiver 410 is provided to descramblers 442 and 452 in the k fingers 440 and 450. Each of the k descramblers 442 and 452 multiplies the converted digital signal by the scrambling code for identifying Node Bs, and outputs a descrambled signal. The scrambling code is provided from the searcher 420 as information on a cell by a command from the controller 430. The controller 430 previously has information on the scrambling code through the Radio Bearer Setup procedure or the Radio Bearer Reconfiguration procedure.

MBMS data output from the k scrambler 442 and 452 are provided to k despreaders 446 and 456, and k channel estimators 444 and 454, respectively. The channel estimators 444 and 454 receive outputs of the descramblers 442 and 452, respectively, and output channel estimation values. The process of measuring a CPICH value and assigning a corresponding path to a finger by the searcher 420 will be described with reference to a process of initially assigning a corresponding path to a finger, and after the corresponding path is assigned to the finger, a function of measuring a CPICH value is transferred to the channel estimators 444 and 454. The channel estimation values are input to k corresponding MBMS data demodulators 448 and 458. The despreaders 446 and 456 despread the MBMS data by a channelization code provided from the searcher 420. The despread MBMS data output from the despreaders 446 and 456 is input to the k corresponding MBMS data demodulators 448 and 458 and the k corresponding dedicated pilot channel estimators 447 and 457.

Each of the dedicated pilot channel estimators 447 and 457 outputs a channel estimation value (hereinafter referred to as a "dedicated pilot channel estimation value") corresponding to a dedicated pilot channel available in an MBMS channel or other channels. For example, MBMS data signals assigned to the fingers 440 and 450 undergo the descrambling process and the despreading process before being demodulated into channel data. The demodulated signal is comprised of a dedicated pilot channel signal and an actual data part. However, in some cases, the demodulated signal does not include the dedicated pilot channel. When the demodulated signal includes a dedicated pilot channel signal, the dedicated pilot channel signal estimators 447 and 457 estimate dedicated pilot channel estimation values by the dedicated pilot channel signal. RSCP or Ec/No of the dedicated pilot channel signal is used as the dedicated pilot channel estimation values. The dedicated pilot channel estimators 447 and 457 monitor reception power of corresponding MBMS data signals based on the dedicated pilot channel estimation values. The dedicated pilot channel estimation values from the dedicated pilot channel estimators 447 and 457 are provided to the corresponding MBMS data demodulators 448 and 458, respectively. In a soft handover situation, an MBMS data signal received through each path can be an MBMS multipath signal transmitted from several cells. Otherwise, the MBMS data signal becomes an MBMS multipath component signal transmitted by the current cell.

Therefore, the MBMS data demodulators 448 and 458 perform channel compensation on inputs from the despreaders 446 and 456 using the channel estimation values from the channel estimators 444 and 454, thereby extracting MBMS data signals received through respective paths. The MBMS data demodulators 448 and 458 determine whether to extract corresponding MBMS data signals according to the dedicated pilot channel estimation values from the dedicated pilot channel estimators 447 and 457. This corresponds to an operation of determining whether to combine corresponding channels based on reception power of the corresponding dedicated pilot channel signal. The MBMS data demodulators 448 and 458 demodulate MBMS data signals assigned according to the determination result. That is, if it is determined to perform soft combining, the MBMS data demodulators 448 and 458 demodulate received MBMS data signals, and provide the demodulated MBMS data signals to the combiner 460. However, if it is determined not to perform soft combining, the MBMS data demodulators 448 and 458 do not demodulate received MBMS data signals, or do not provide demodulated MBMS data signals to the combiner 460 even though they demodulate the received MBMS data signals. A detailed operation of determining whether to perform soft combining will be described with reference to FIG. 6.

MBMS multipath component signals output from the MBMS data demodulators 448 and 458 are provided to the combiner 460. The combiner 460 combines the MBMS multipath component signals provided from the MBMS data demodulators 448 and 458, i.e., the fingers 440 and 450, and provide the combined signal to a channel decoder 470.

As is understood from the foregoing description, the present invention is implemented such that an MBMS data signal which will be combined by the combiner 460 is selected based on a dedicated pilot channel estimation value. That is, the present invention proposes a method for separately calculating dedicated pilot channel estimation values for MBMS data signals input to the fingers 440 and 450, and determining whether to demodulate corresponding MBMS data signals based on the dedicated pilot channel estimation values. If it is proposed not to demodulate corresponding MBMS data signals based on the dedicated pilot channel estimation values, MBMS multipath component signals from the corresponding MBMS data signals will not be provided to the combiner 460. This means that combining is not performed on the corresponding MBMS data signals.

MBMS data signals assigned to the fingers are stored in a buffer and then combined in the combiner 460. As described above, by synchronizing transmission timings of the same MBMS data between respective cells to limit a time difference to several hundreds of chips, the combiner 460 can combine respective signal components.

Because the combiner 460 is informed of a frame offset of an MBMS signal assigned to all fingers by the controller 430, it can perform combining taking into consideration a frame offset between signals. That is, by acquiring synchronization with timing of a reference finger by applying a relative frame offset for a corresponding cell assigned to each finger on the basis of a finger to which an MBMS data signal with earliest reception timing is assigned, it is possible to combine the same symbols from different fingers. This is possible because the combiner 460 already has MBMS offset information between the RNC and the UE through the Radio Bearer Setup/Reconfiguration procedures. The combined MBMS multipath component signal is decoded into a final MBMS signal by the channel decoder 470.

Dedicated Pilot Channel Estimator

Figure 5:
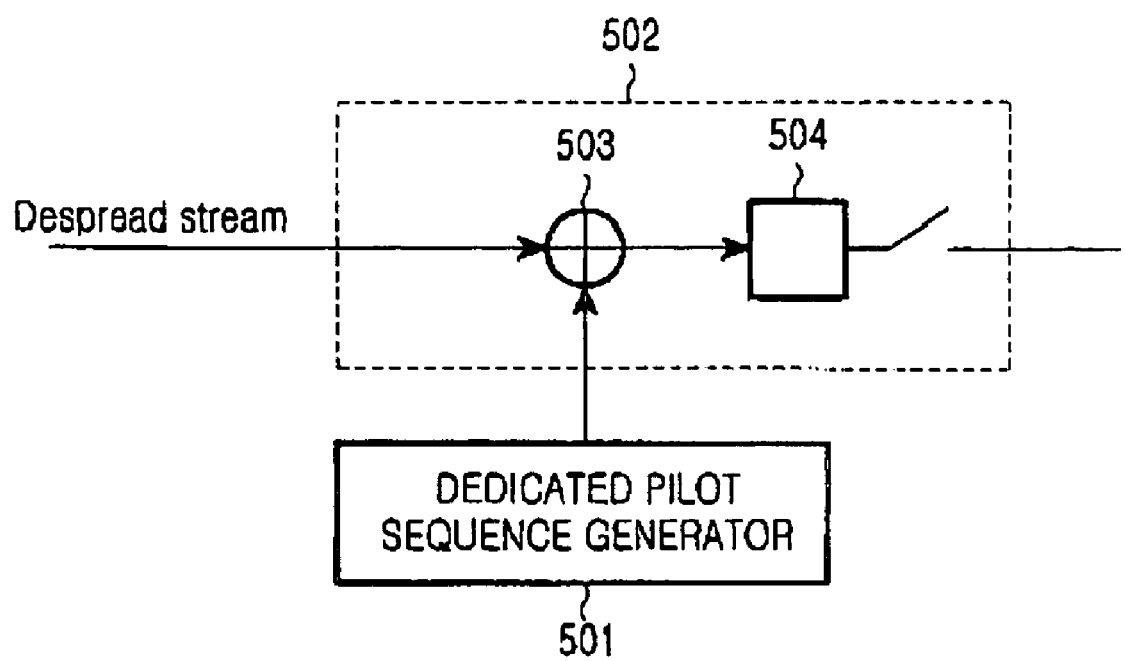
FIG. 5 is a block diagram illustrating a detailed structure of the dedicated pilot channel estimator according to an embodiment of the present invention.

FIG. 5 is a block diagram illustrating a detailed structure of the dedicated pilot channel estimator in FIG. 4. Referring to FIG. 5, a dedicated pilot channel estimator 502 receives a despread sequence from the despreaders 446 and 456 of FIG. 4 and a dedicated pilot sequence from a dedicated pilot sequence generator 501. The dedicated pilot sequence is based on channel information. The despread sequence is multiplied by the dedicated pilot sequence by a multiplier 503 in the dedicated pilot channel estimator 502. A value output by the multiplier is accumulated by an accumulator 504 for a period of the dedicated pilot sequence. The accumulated value is used as an RSCP value, and can later be used for determining whether to perform soft combining. During the accumulation, an accumulation period should become a period where it is expected that a dedicated pilot channel will actually exist in the entire input sequence period.

C.2 Operation of UE

Figure 6:
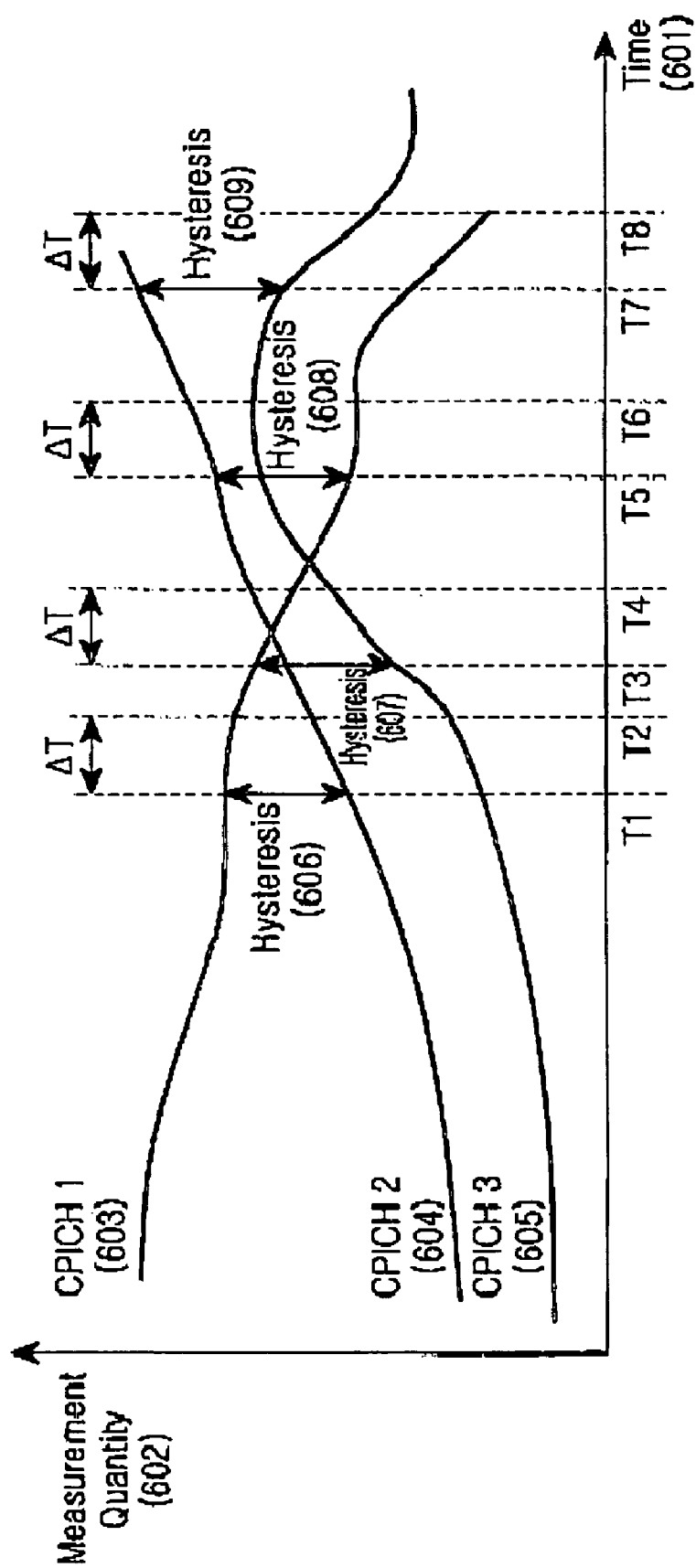
FIG. 6 is a group illustrating an example of a soft combining procedure by a measurement value for a common pilot channel according to an embodiment of the present invention.

Referring to FIG. 6, an MBMS soft handover procedure according to an embodiment of the present invention will be described. assuming that a UE is located in a handover region where it can simultaneously receive MBMS data from two or more cells. A UE receives MBMS data only from cell #1 that transmits CPICH1 603, until a time T1 on a time axis 601. At time T1, the UE compares a measurement value by CPICH2 604 from cell #2 with a measurement value by CPICH1 603, and a difference between the measurement values begins to fall within a hysteresis value 606. Therefore, at time T1, the UE prepares for soft combining and sets a timer to a time T. At a time T2 where the timer expires, because a difference between the measurement value by CPICH1 603 and the measurement value by CPICH2 604 does not exceed the hysteresis value 606, the UE performs soft combining when measurement values for dedicated pilot channels of MBMS data received from cell #1 and cell #2 are sufficiently large.

Thereafter, at a time T3, because a difference between the measurement values by CPICH1 603 and a CPICH3 605 satisfies a hysteresis value 607, the UE sets a timer to a time T. At a time T4 where the timer expires, the UE determines a difference between the measurement values by CPICH1 603 and CPICH3 605. If the difference continuously satisfies the hysteresis value 607, the UE performs soft combining on MBMS data received from cell #3 when a measurement value for the dedicated pilot channel is sufficiently large.

Therefore, after time T4, the UE can soft-combine all MBMS data received from cell #1, cell #2 and cell #3, satisfying a basic condition.

Thereafter, at a time T5, if a difference between the measurement values by CPICH1 603 and CPICH2 604 satisfies a hysteresis value 608, the UE sets a timer in order to determine again whether to perform soft combining. The timer is set to a time T. At a time T6 where the timer expires, because a difference between the measurement values by CPICH1 603 and CPICH2 604 exceeds the hysteresis value 608, the UE excludes the MBMS data from cell #1 from soft combining. Therefore, after the time T6, the UE soft-combines MBMS data from cell #2 and cell #3.

Finally, at a time T7, because a difference between the measurement values by CPICH2 604 and CPICH3 605 satisfies a hysteresis value 609, the UE sets a timer in order to determine again whether to perform soft combining. The timer is set to a time T. At a time T8 where the timer expires, because a difference between the measurement values by CPICH2 604 and CPICH3 605 exceeds the hysteresis value 609, the UE excludes MBMS data from cell #3 from soft combining. As a result, the UE receives only the MBMS data from cell #2 after time T7.

In FIG. 6, the hysteresis values 606, 607, 608 and 609 can be identical to or different from each other. For example, the hysteresis values 606 and 607 having the same value used as a criterion for adding corresponding MBMS data to soft combining are different from the hysteresis values 608 and 609 having the same value used as a criterion for excluding corresponding MBMS data from soft combing.

Figure 7:
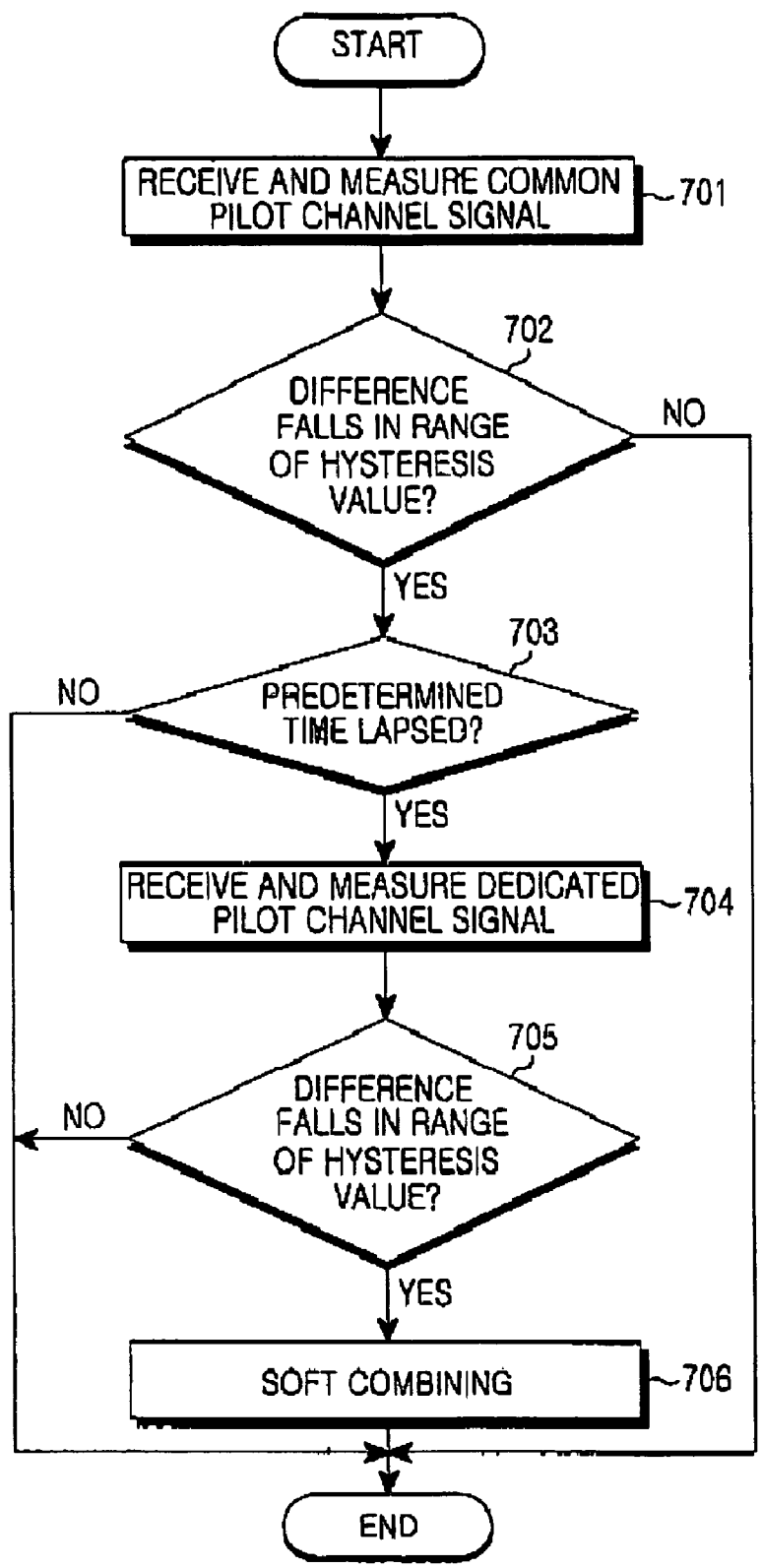
FIG. 7 is a flowchart illustrating a control operation of a UE for soft combining according to an embodiment of the present invention.

FIG. 7 is a flowchart illustrating a control operation of a UE for soft combining according to an embodiment of the present invention. Referring to FIG. 7, a searcher 420, under the control of a controller 430, searches for the neighbor cells providing the same MBMS service among neighbor cells. That is, in step 701, the searcher 420 receives CPICH values of multipath signals from an analog receiver 410, and measures RSCP or Ec/No for each of the received CPICH values. The controller 430 receives measurement values for the CPICH values from the searcher 420. The measurement values include a first measurement value corresponding to a CPICH value from a source Node B and a second measurement value corresponding to a CPICH value from at least one neighbor Node B. In step 702, the controller 430 compares a relative difference between the first measurement value and the second measurement value with a predetermined hysteresis value. If the difference falls within a range of the hysteresis value, the controller 430 proceeds to step 703.

In step 703, it is determined whether the difference has fallen within a range of the hysteresis value for a predetermined time. This can be done by setting a timer for monitoring a predetermined time at a time when the difference is included in a range of the hysteresis value, and then determining whether the above situation is maintained until the set timer expires. To this end, the searcher 420 periodically measures a CPICH value for a corresponding path, and reports the measurement value to the controller 430.

If it is determined in step 703 that the difference has fallen within a range of the hysteresis value for the predetermined time, the controller 430 commands the searcher 420 to assign a finger for receiving MBMS data corresponding to CPICH from which the difference is derived. If the command is sent and a corresponding cell is determined as a cell that provides an MBMS service through the Radio Bearer Setup/Reconfiguration procedure, it can be basically considered that a condition for soft-combining MBMS data is satisfied. Then the searcher 420 assigns a finger to a corresponding path based on the command, and then performs demodulation on an MBMS data signal received through the path. The demodulation procedure includes steps 704 and 705.

In step 704, a dedicated pilot channel estimator 447 or 457 in the finger receives a despread dedicated pilot channel signal, and measures RSCP or Ec/No for the dedicated pilot channel signal. Thereafter, in step 705, the dedicated pilot channel estimator determines whether a level of the measurement value falls within a range of a predetermined hysteresis value or determines whether a level of the measurement value exceeds a threshold. If the condition in step 705 is satisfied, an MBMS data demodulator 448 or 458 in the finger demodulates an MBMS data signal received through the assigned path. The demodulated MBMS data signal is output to a combiner 460 so that it can be combined with an MBMS data signal received through another path. In step 706, the combiner 460 actually performs soft combining on MBMS data signals provided from the fingers to which particular paths are assigned.

As can be understood from the foregoing description, in an asynchronous CDMA mobile communication system supporting MBMS, when a UE moves to a region where it can receive data from a plurality of Node Bs, the present invention provides soft handover to the UE. In this way, even though an MBMS user moves from a current or existing to a new cell, the invention provides a stable MBMS service to the user, thereby contributing to the user's convenience.

In addition, when a UE is located in a handover region, the invention allows the UE to soft-combine MBMS data received from a plurality of Node Bs by itself, thus contributing to a reduction in transmission power of Node Bs and improvement in power efficiency.

In providing such a soft handover, it is determined whether an MBMS service is actually performed, using a measurement value of a dedicated pilot channel signal, thereby preventing frequent signaling. For example, in the case where MBMS broadcast channel information of a neighbor Node B is periodically provided, it is possible to reduce a signaling load by increasing a signaling period and to prevent a UE from performing incorrect combining due to the neighbor Node B information which is not timely updated.

When MBMS broadcast channel information for neighbor Node Bs is provided on a real-time basis, an increase in number of neighbor Node Bs and frequent appearance/disappearance or handover of a UE desiring to receive an MBMS service considerably increase the amount of signaling. In this case, if the present invention is applied, signaling for updating neighbor MBMS channel information during disappearance of an MBMS channel is necessary only when a channel which was used as an MBMS channel is used for another use, thereby contributing to a considerable reduction in the amount of signaling.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for soft-combining Multimedia Broadcast/Multicast Service (MBMS) data from a source Node B providing MBMS data for an MBMS service and neighbor Node Bs by a user equipment (UE) in a Code Division Multiple Access (CDMA) mobile communication, the UE receiving the MBMS data from the source Node B, and the neighbor Node Bs for handover from the source Node B the method comprising the steps of:

measuring reception power of a dedicated pilot channel signal from at least one neighbor Node B that provides the same MBMS service as the MBMS service from the source Node B; and comparing the measured reception power with a predetermined threshold, and soft-combining MBMS data from the at least one neighbor Node B with MBMS data from the source Node B according to the comparison result.

2. The method of claim 1, wherein the measurement value is a signal-to-noise ratio of a dedicated pilot channel signal.

3. The method of claim 2, wherein if the measurement value from the at least one neighbor Node B is larger than the measurement value for the dedicated pilot channel signal from the source Node B by at least a predetermined threshold, it is determined that soft combining is required.

4. The method of claim 1, wherein if a difference between the measurement value for the dedicated pilot channel signal from the source Node B and the measurement value from the at least one neighbor Node B falls within a predetermined hysteresis value, it is determined that soft combing is required.

5. The method of claim 1, wherein if a value determined by adding measurement values for all multipath signals for a dedicated pilot channel from the at least one neighbor Node B is larger than a value determined by adding measurement values for all multipath signals for a dedicated pilot channel from the source Node B by at least a predetermined threshold or higher, it is determined that soft combing is required.

6. An apparatus for soft-combining Multimedia Broadcast/Multicast Service (MBMS) data from a source Node B providing MBMS data for an MBMS service with MBMS data from a neighbor Node B by a user equipment (UE) in an asynchronous Code Division Multiple Access (CDMA) mobile communication system including the source Node B for, the UE receiving the MBMS data from the source Node B, and at least one neighbor Node B for handover from the source Node B, the neighbor Node B providing the MBMS service provided by the source Node B, the apparatus comprising:

a dedicated pilot channel estimator for measuring reception power of a dedicated pilot channel signal assigned thereto among dedicated pilot channel signals from neighbor Node Bs, and determining whether to perform soft combining on MBMS data from a corresponding neighbor Node B according to whether the measurement value satisfies a predetermined condition;

demodulators for receiving MBMS data from the corresponding neighbor Node B and demodulating the MBMS data according to the determination result of the dedicated pilot channel estimator; and a combiner for performing soft combining on the MBMS data, if the MBMS data is received from at least two of the demodulators.

7. The apparatus of claim 6, wherein the measurement value is a signal-to-noise ratio of a dedicated pilot channel signal.

8. The apparatus of claim 6, wherein if the measurement value from the at least one neighbor Node B is larger than the measurement value for the dedicated pilot channel signal from the source Node B by at least a predetermined threshold, it is determined that soft combining is required.

9. The apparatus of claim 6, wherein if a difference between the measurement value for the dedicated pilot channel signal from the source Node B and the measurement value from the at least one neighbor Node B falls within a predetermined hysteresis value, it is determined that soft combing is required.

10. The apparatus of claim 6, wherein if a value determined by adding measurement values for all multipath signals for a dedicated pilot channel from the at least one neighbor Node B is larger than a value determined by adding measurement values for all multipath signals for a dedicated pilot channel from the source Node B by at least a predetermined threshold, it is determined that soft combing is required.

* * * * *